(12) United States Patent
Bonja et al.

(10) Patent No.: US 10,404,099 B1
(45) Date of Patent: Sep. 3, 2019

(54) INTERMEDIATE POWER SUPPLY UNIT FOR DISTRIBUTING LOWER VOLTAGE POWER TO REMOTE POWER DISTRIBUTION SYSTEMS

(71) Applicant: Corning Optical Communications Wireless Ltd, Airport City (IL)

(72) Inventors: Jeffrey Albert Bonja, Sturbridge, MA (US); Mark Edward Conner, Granite Falls, NC (US); Ami Hazani, Ra'anana (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/907,608

(22) Filed: Feb. 28, 2018

(51) Int. Cl.
*H02J 13/00* (2006.01)
*H04W 16/24* (2009.01)
*H04W 88/08* (2009.01)

(52) U.S. Cl.
CPC ......... *H02J 13/0003* (2013.01); *H04W 16/24* (2013.01); *H04W 88/085* (2013.01)

(58) Field of Classification Search
CPC .. H02J 13/0003; H04W 16/24; H04W 88/085
See application file for complete search history.

(56) References Cited

U.S. PATENT DOCUMENTS

| | | | |
|---|---|---|---|
| 5,774,316 | A | 6/1998 | McGary et al. |
| 6,584,197 | B1 | 6/2003 | Boudreaux, Jr. et al. |
| 7,545,055 | B2 | 6/2009 | Barrass |
| 8,781,637 | B2 | 7/2014 | Eaves |
| 2003/0178979 | A1 | 9/2003 | Cohen |
| 2008/0159744 | A1 | 7/2008 | Soto et al. |
| 2015/0207318 | A1 | 7/2015 | Lowe et al. |
| 2015/0215001 | A1 | 7/2015 | Eaves |
| 2018/0167312 | A1* | 6/2018 | Liu .................. H04L 45/22 |

FOREIGN PATENT DOCUMENTS

| | | |
|---|---|---|
| EP | 1347607 A1 | 9/2003 |
| EP | 2643947 B1 | 9/2018 |
| WO | 2012115843 A1 | 8/2012 |

OTHER PUBLICATIONS

International Search Report and Written Opinion PCT/US2019/017978 dated May 17, 2019, 12 Pgs.

* cited by examiner

*Primary Examiner* — Daniel J Cavallari
(74) *Attorney, Agent, or Firm* — C. Keith Montgomery

(57) ABSTRACT

An intermediate power supply unit for distributing lower voltage power to remote devices is disclosed. The intermediate power supply unit includes a higher voltage power input configured to receive power distributed by a power source and a power coupling circuit configured to couple the higher voltage power input to a plurality of power coupling outputs. If it is determined that a wire coupling the power source to the higher voltage power input is touched, the higher voltage power input is decoupled from the power coupling outputs. The intermediate power supply unit also includes a power converter circuit configured to convert voltage on higher voltage inputs to a lower voltage applied to one or more lower voltage outputs. The power converter circuit is also configured to distribute power from the one or more lower voltage outputs over a power conductor coupled to an assigned remote device.

13 Claims, 9 Drawing Sheets

INTERMEDIATE POWER SUPPLY UNIT FOR DISTRIBUTING LOWER VOLTAGE POWER TO REMOTE POWER DISTRIBUTION SYSTEMS

BACKGROUND

The disclosure relates generally to distribution of power to one or more power consuming devices over power wiring, and more particularly to distribution of lower voltage power to remote communications devices in a distributed communications systems (DCS), such as distributed antenna systems (DAS) for example, for operation of power consuming components of the remote units.

Wireless customers are increasingly demanding wireless communications services, such as cellular communications services and Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a wireless distributed communications system (WDCS) 100 that is configured to distribute communications services to remote coverage areas 102(1)-102(N), where 'N' is the number of remote coverage areas. The WDCS 100 in FIG. 1 is provided in the form of a DAS 104. The DAS 104 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the RAUs 106 (1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the RAUs 106(1)-106(N).

With continuing reference to FIG. 1, the RAUs 106(1)-106(N) are configured to receive the downlink communications signals 112D from the central unit 108 over the communications link 114. The downlink communications signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the RAUs 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The RAUs 106(1)-106(N) are also configured to receive uplink communications signals 112U from the UE 120 in the respective remote coverage areas 102(1)-102(N) to be distributed to the source transceiver 110.

Because the RAUs 106(1)-106(N) include components that require power to operate, such as the RF transmitter/receivers 116(1)-116(N) for example, it is necessary to supply power to the RAUs 106(1)-106(N). In one example, the RAUs 106(1)-106(N) may receive power from a local power source. In another example, the RAUs 106(1)-106(N) may be powered remotely from a remote power source(s). For example, the central unit 108 may include or be coupled a power source 122 and configured to remotely distribute power over cables that carry the communications links 114 to the RAUs 106(1)-106(N). For example, the communications links 114 may be cables that include electrical conductors for carrying current (e.g., direct current (DC)) to the RAUs 106(1)-106(N). If the WDCS 100 is an optical fiber-based WDCS in which the communications links 114 include optical fibers, the communications links 114 may by a "hybrid" cable that includes optical fibers for carrying the downlink and uplink communications signals 112D, 112U and separate electrical conductors for carrying current to the RAUs 106(1)-106(N). Examples for low power delivery over communication lines are: Telephony lines that are used to carry xDSL modem (Digital) with voice (Analog) signals together with power, or alternatively Power over Ethernet (PoE) which carries power and Ethernet over CAT5 or CAT6 wire cables.

Some regulations, such as IEC 60950-21, may limit the amount of direct current (DC) that is remotely delivered by the power source 122 over the communications links 114 to less than the amount needed to power the RAUs 106(1)-106(N) during peak power consumption periods for safety reasons, such as in the event a human contacts the wire. One solution to remote power distribution limitations is to employ multiple conductors and split current from the power source 122 over the multiple conductors, such that the current on any one electrical conductor is below the regulated limit. Another solution includes delivering remote power at a higher voltage so that a lower current can be distributed at the same power level. For example, assume that 300 Watts of power is to be supplied to a RAU 106(1)-106(N) by the power source 122 through a communications link 114. If the voltage of the power source 122 is 60 Volts (V), the current will be 5 Amperes (A) (i.e., 300 W/60 V). However, if a 400 Volt power source 122 is used, then the current flowing through the wires will be 0.75 A. However, delivering high voltage through electrical conductors may be further regulated to prevent an undesired current from flowing through a human in the event that a human contacts the electrical conductor. Thus, these safety measures may require other protections, such as the use of protection conduits, which may make installations more difficult and add cost.

No admission is made that any reference cited herein constitutes prior art. Applicant expressly reserves the right to challenge the accuracy and pertinency of any cited documents.

SUMMARY

Embodiments of the disclosure relate to an intermediate power supply unit for distributing lower voltage power in a remote power distribution system. As a non-limiting example, such an intermediate power supply unit may be provided in a distributed communications systems (DCS). For example, the DCS may be a wireless DCS, such as a distributed antenna system (DAS) that is configured to distribute communications signals, including wireless communications signals, to a plurality of remote units over physical communications media, to then be distributed from the remote units wirelessly to client devices in wireless communication range of a remote unit. In exemplary aspects disclosed herein, the power distribution system includes one or more intermediate power supply units each configured to distribute higher voltage power from a power source over current carrying electrical conductors ("power conductors") to a lower voltage power to remote units to provide power to power consuming components of the remote units for operation. For example, an intermediate power supply unit may be installed on each floor of a multi-floor building in which the power distribution system is installed to provide power to the remote units installed on a given floor.

In examples disclosed herein, each intermediate power supply unit includes a higher voltage power input configured to receive power distributed by a power source. The intermediate power supply unit also includes a power coupling circuit coupled to the higher voltage power input comprising a plurality of power coupling outputs. The power coupling circuit is configured to couple the higher voltage power input to the plurality of power coupling outputs. The intermediate power supply unit can also be configured to aid in detection of a change in impedance on a wire coupling for safety reasons, such as from a human touch or a shorting of the wire coupling. If such change is detected on wire coupling, the power coupling circuit is further configured to be decoupled from the high voltage power supply. The intermediate power supply unit also includes a power converter circuit, which includes a higher voltage input coupled to a corresponding power coupling output of the power coupling outputs of the power coupling circuit, and one or more lower voltage outputs. The power converter circuit is configured to convert voltage on the higher voltage inputs to a lower voltage applied to the one or more lower voltage outputs where the lower voltage is lower than the higher voltage. The power converter circuit is also configured to distribute power from the one or more lower voltage outputs over a power conductor coupled to an assigned remote unit among a plurality of remote units.

An additional aspect of the disclosure relates to a method of operating an intermediate power supply unit to distribute power from a power source to a plurality of remote units in a remote power distribution system such as a distributed communications system (DCS). The method comprises coupling a higher voltage power input of the intermediate power supply unit to a plurality of power coupling outputs. The method further comprises, in order to determine that a wire coupling the power source to the higher voltage power input is touched, decoupling the higher voltage power input of the intermediate power supply unit from the plurality of power coupling outputs. The method further comprises converting voltage on one or more higher voltage inputs of a power converter circuit to a lower voltage applied to one or more lower voltage outputs of the power converter circuit where the lower voltage is lower than the higher voltage. The method further comprises distributing power from the one or more lower voltage outputs of the power converter circuit over a power conductor configured to be coupled to an assigned remote unit among the plurality of remote units.

An additional aspect of the disclosure relates to a DCS. The DCS comprises a central unit. The central unit is configured to distribute received one or more downlink communications signals over one or more downlink communications links to one or more remote units. The central unit is also configured to distribute received one or more uplink communications signals from the one or more remote units from one or more uplink communications links to one or more source communications outputs. The DCS also comprises a plurality of remote units. Each remote unit among the plurality of remote units comprises a remote power input coupled to a power conductor carrying current from an intermediate power supply unit. The remote unit is configured to distribute the received one or more downlink communications signals received from the one or more downlink communications links, to one or more client devices. The remote unit is also configured to distribute the received one or more uplink communications signals from the one or more client devices to the one or more uplink communications links. The DCS also comprises an intermediate power supply unit. The intermediate power supply unit includes a higher voltage power input configured to receive power distributed by a power source. The intermediate power supply unit also includes a power coupling circuit coupled to the higher voltage power input comprising a plurality of power coupling outputs. The power coupling circuit is configured to couple the higher voltage power input to the plurality of power coupling outputs. In order to determine that a wire coupling the power source to the higher voltage power input is touched, the power coupling circuit is further configured to decouple the higher voltage power input from the plurality of power coupling outputs. The intermediate power supply unit also includes a power converter circuit, which includes a higher voltage input coupled to a corresponding power coupling output of the power coupling outputs of the power coupling circuit, and one or more lower voltage outputs. The power converter circuit is configured to convert voltage on the higher voltage inputs to a lower voltage applied to the one or more lower voltage outputs where the lower voltage is lower than the higher voltage. The power converter circuit is also configured to distribute power from the one or more lower voltage outputs over a power conductor coupled to an assigned remote unit among a plurality of remote units.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to an intermediate power supply unit for distributing lower voltage power to remote power distribution systems. As a non-limiting example, such an intermediate power supply unit may be provided in a distributed communications systems (DCS). For example, the DCS may be a wireless DCS, such as a distributed antenna system (DAS) that is configured to distribute communications signals, including wireless communications signals, to a plurality of remote units over physical communications media, to then be distributed from the remote units wirelessly to client devices in wireless communication range of a remote unit. In exemplary aspects disclosed herein, the DCS includes one or more intermediate power supply units each configured to distribute higher voltage power from a power source over current carrying electrical conductors ("power conductors") to a lower voltage power to remote communications units to provide power to power consuming components of the remote units for operation. For example, an intermediate power supply unit may be installed on each floor of a multi-floor building in which the DCS is installed to provide power to the remote units installed on a given floor.

Figure 1:
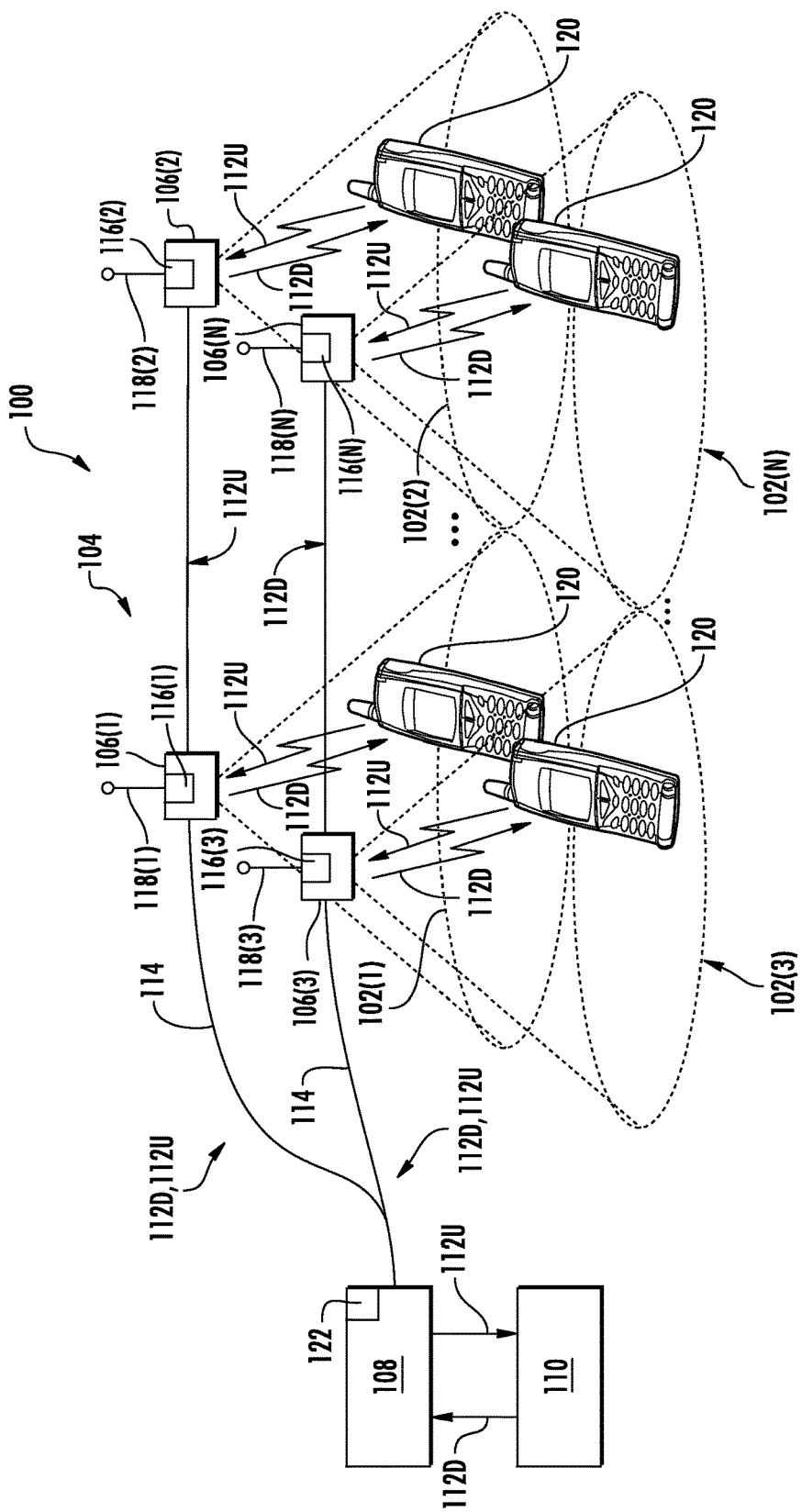
FIG. 1 is a schematic diagram of an exemplary wireless distributed communications system (DCS) in the form of a distributed antenna system (DAS)
Figure 2:
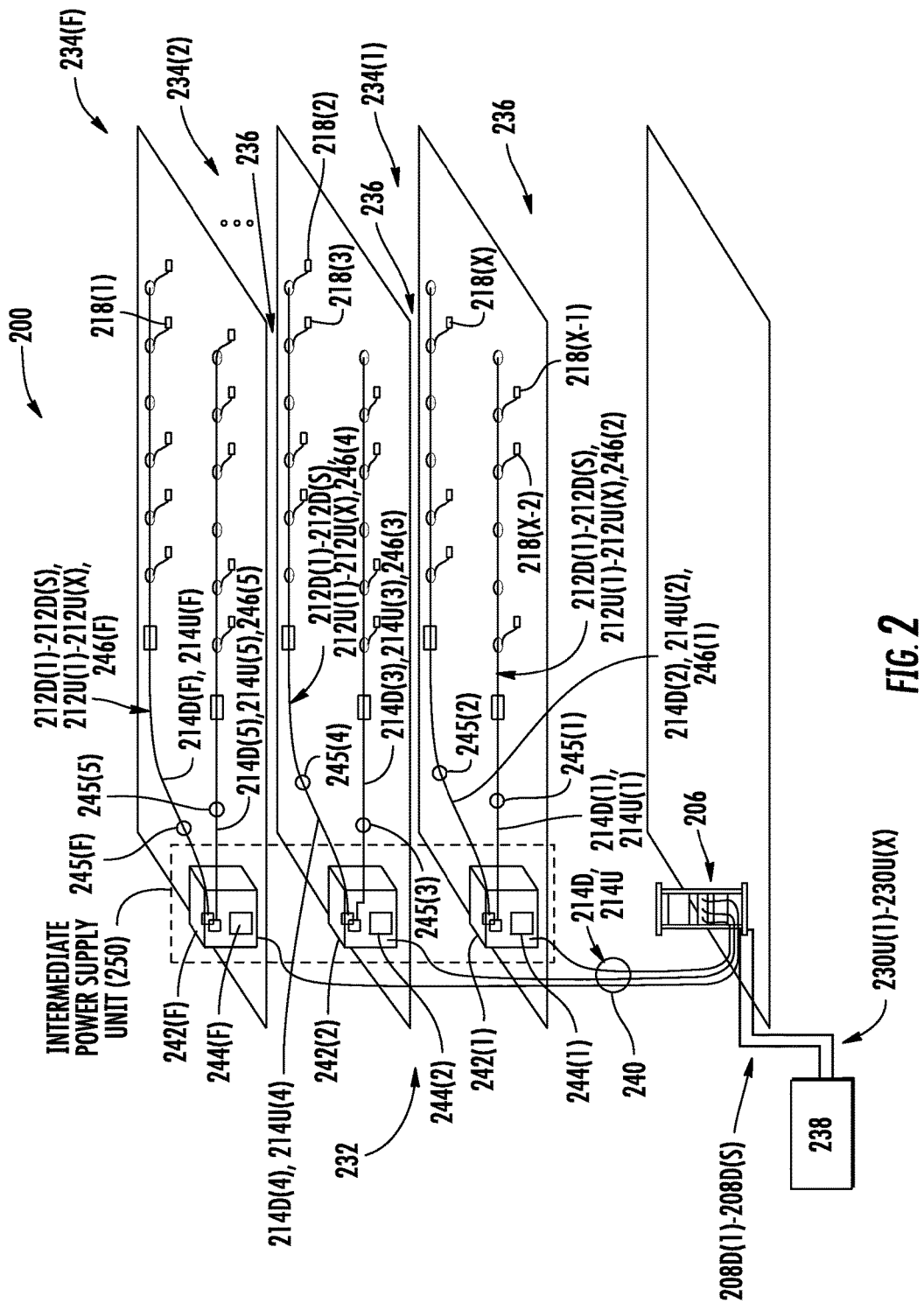
FIG. 2 is a partially schematic cut-away diagram of an exemplary building infrastructure in which a DCS in FIG. 7 can be provided.
Figure 3:
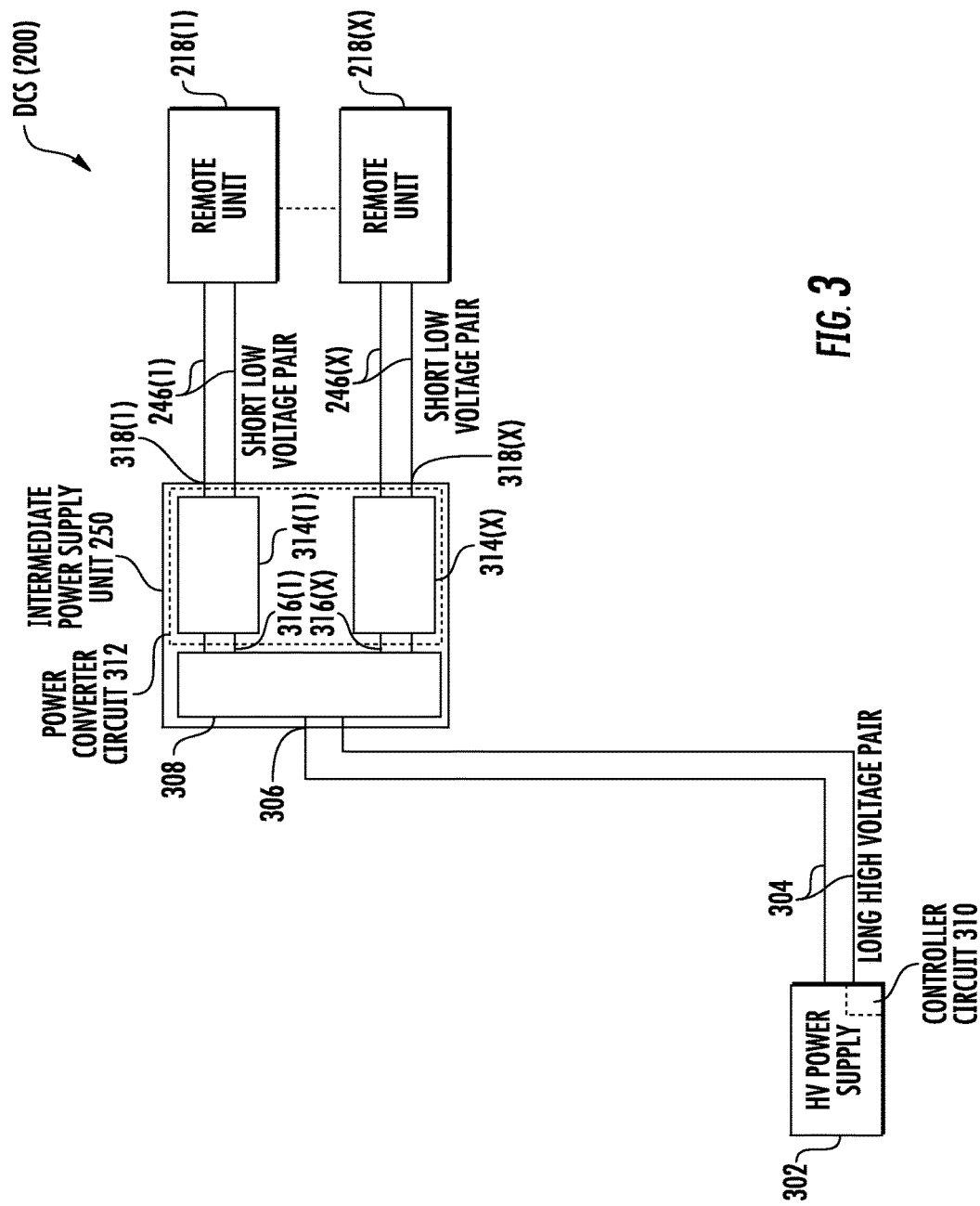
FIG. 3 is a schematic diagram of an intermediate power supply unit in a DCS for distributing lower voltage power from a higher voltage power source to a plurality of remote units in a DCS.

Before discussing exemplary details of power distribution systems that can be included in a DCS for distribution of lower voltage power to remote communications devices in a DCS starting at FIG. 3, an exemplary DCS that can include remote power distribution is described in FIG. 2.

Figure 7:
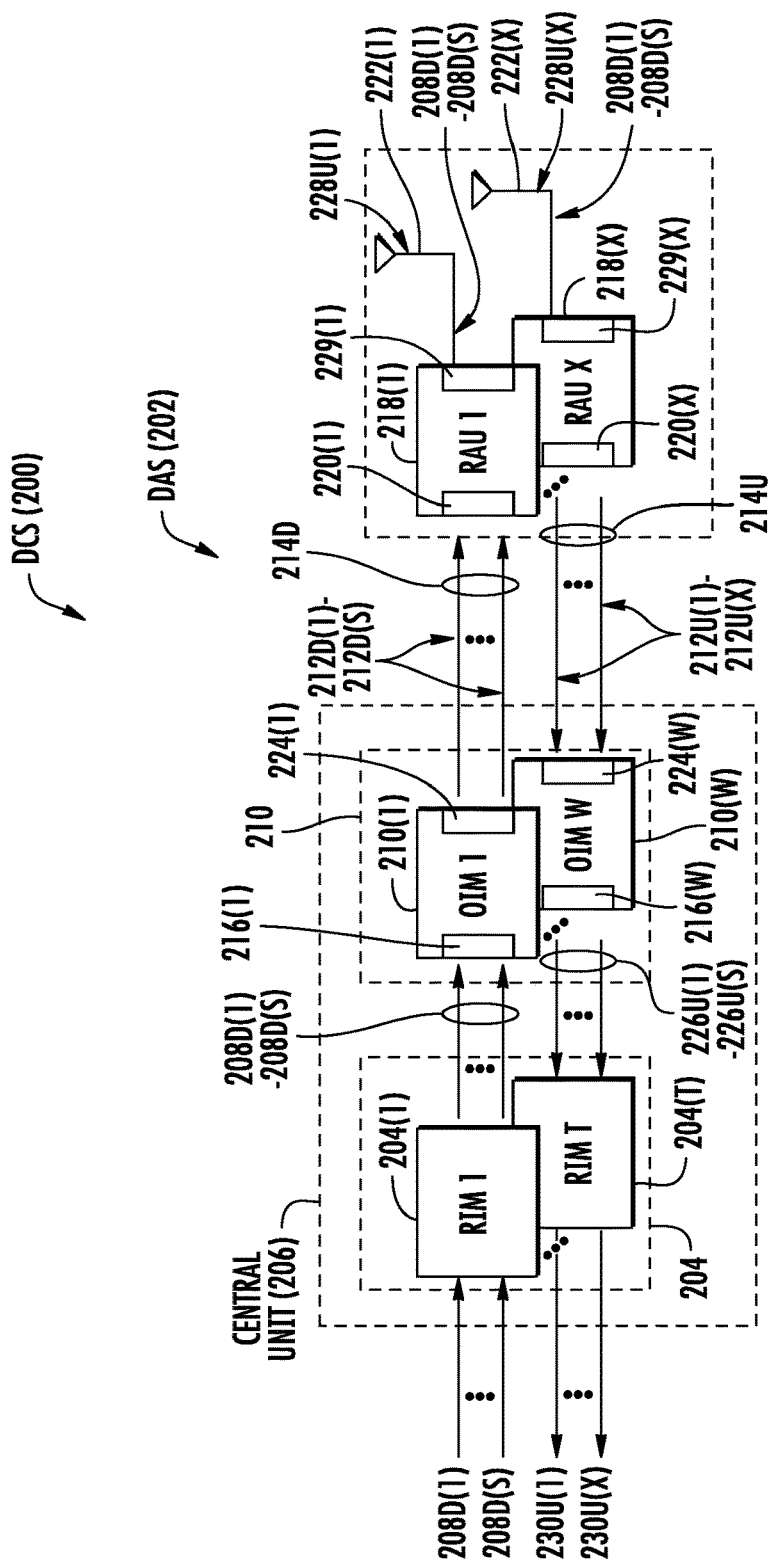
FIG. 7 is a schematic diagram of an exemplary optical-fiber based DCS in the form of a DAS configured to distribute communications signals between a central unit and a plurality of remote units, and that can include one or more power distribution systems configured to distribute power to a plurality of remote units and provide a safety power disconnect of the power source to remote units.
Figure 8:
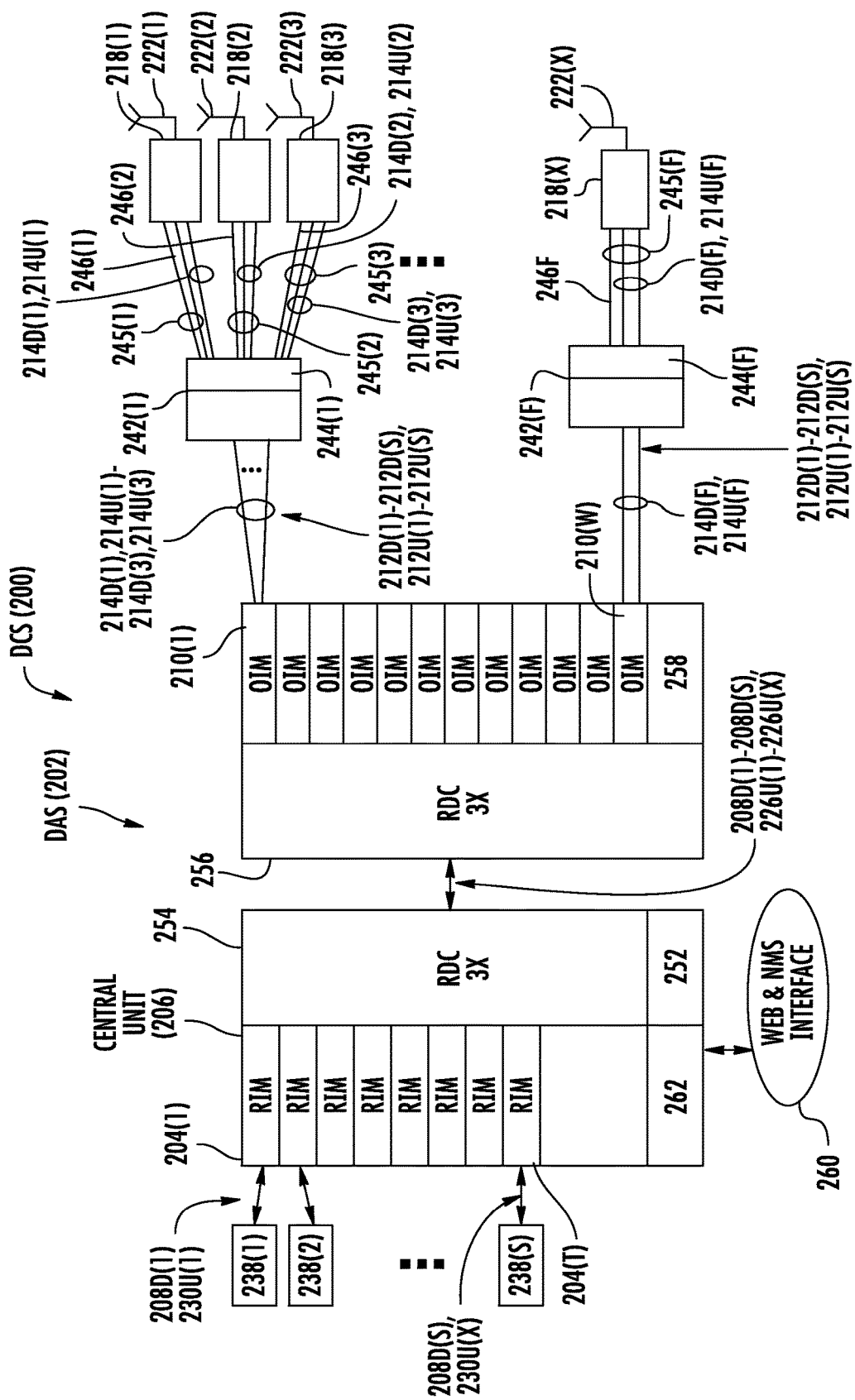
FIG. 8 is a partially schematic cut-away diagram of an exemplary building infrastructure in which a DCS in FIG. 7 can be provided.

In this regard, FIG. 2 is a partially schematic cut-away diagram of an exemplary building infrastructure in which a DCS in FIG. 7 can be provided. FIG. 2 is a partially schematic cut-away diagram of a building infrastructure 232 employing the DCS 200. FIG. 8 is a schematic diagram of the DCS 200 installed according to the building infrastructure 232 in FIG. 2.

With reference to FIG. 2, the building infrastructure 232 in this embodiment includes a first (ground) floor 234(1), a second floor 234(2), and a Fth floor 234(F), where 'F' can represent any number of floors. The floors 234(1)-234(F) are serviced by a central unit 206 to provide antenna coverage areas 236 in the building infrastructure 232. The central unit 206 is communicatively coupled to a signal source 238, such as a base transceiver station (BTS) or baseband unit (BBU), to receive the downlink electrical communications signals 208D(1)-208D(S) and to send uplink electrical communications signals 230U(1)-230U(X). The central unit 206 is communicatively coupled to the remote units 218(1)-218(X) to receive optical uplink communications signals 212U(1)-212U(X) from the remote units 218(1)-218(X) as previously described in FIG. 2. The downlink and uplink optical communications signals 212D(1)-212D(S), 212U(1)-212U(X) are distributed between the central unit 206 and the remote units 218(1)-218(X) over a riser cable 240 in this example. The riser cable 240 may be routed through interconnect units (ICUs) 242(1)-242(F) dedicated to each floor 234(1)-234(F) for routing the downlink and uplink optical communications signals 212D(1)-212D(S), 212U(1)-212U(X) to the remote units 218(1)-218(X). The ICUs 242(1)-242(F) may also include respective power distribution circuits 244(1)-244(F) that include power sources and at least one intermediate power supply unit 250, wherein the power distribution circuits 244(1)-244(F) are configured to distribute power remotely to the remote units 218(1)-218(X) to provide power for operating the power consuming components in the remote units 218(1)-218(X). For example, array cables 245(1)-245(F) may be provided and coupled between the ICUs 242(1)-242(F) that contain both optical fibers to provide the respective downlink and uplink optical fiber communications media 214D(1)-214D(F), 214U(1)-214U(F) and power conductors 246(1)-246(F) (e.g., electrical wire) to carry current from the respective power distribution circuits 244(1)-244(F) to the remote units 218(1)-218(X).

A concern in high power transfer is the power loss resulting from voltage drop on the wires between a power supply and a remote unit 218 being powered. Voltage drop on the wires is proportional to the current transferred through the wires. In order to provide high power to the remote units 218(1)-218(X) while still transferring low current through the lines, high voltage (HV) power suppliers such as higher voltage power source 302 are used. For example, assume that each power supply is required to provide 1000 Watts. If the power supplies provide a low voltage of 50 volts then the current on the lines will be 1000 W/50V=20 A. Voltage drop on the lines (=Current×Wires_resistance) might be significant in this case. However, if the power supplies provide a high voltage of 500 volts then the current on the lines will be 1000 W/500V=2 A. In this case, the voltage drop on the lines (=Current×Wires_resistance) will be one tenth.

In this regard, FIG. 3 illustrates a schematic diagram of the intermediate power supply unit that can be provided in a DCS for distributing lower voltage power from a higher voltage power source to a plurality of the remote units in the DCS. In this regard, FIG. 3 illustrates intermediate power supply unit 250 that can be provided in the DCS 200 in FIG. 2 in for distributing lower voltage power from a higher voltage power source 302 to a plurality of the remote units 218 in the DCS 200. The intermediate power supply unit 250 receives power from the higher voltage power source 302 through a high voltage pair 304 and higher voltage power inputs 306. For example, the higher voltage power source 302 may be configured to provide 350 Volts. In some embodiments, the high voltage pair 304 is used only for the long segment of the wiring where loss might be significant. In order to provide protection against electrification, many regulations require that the wires that carry high voltage must be isolated, conveyed in expensive conduits, and installed by a certified electrician.

As shown in FIG. 3, the intermediate power supply unit 250 includes a power coupling circuit 308 coupled to the higher voltage power input 306. In some embodiments, this implements at least one side of a power shut down based on touch identification procedure. This power coupling circuit 308 provides protection against electrification by identifying an electrical characteristic that may indicate that the high voltage pair 304 is touched. This electrical characteristic may be identified, for example, by the power source 302 including an optional controller circuit 310 configured to periodically, (e.g., in milliseconds or as otherwise programmed), instruct the intermediate power supply unit 250 to decouple the power conductors 304 from its power consuming components in the remote units 218(1)-218(X) thereby disconnecting the load of the intermediate power supply unit 250 from the power source 302. A current measurement circuit may then measure current flowing on the power conductors 304 and provide a current measurement to the controller circuit 310. The controller circuit 310 may be configured to disconnect the power source 302 from the power conductors 304 for safety reasons in response to detection of a load based on detecting a current from the power source 302 in excess of a threshold current level. For example, a person contacting the power conductors 304 will present a load to the power source 302 that will cause a current to flow from the power source 302 over the power conductors 304. If another load is not contacting the power conductors 304, no current (or only a small amount of current due to current leakages for example) should flow from the power source 302 over the power conductors 304. The controller circuit 310 can be configured to wait a period of time and/or until a manual reset instruction is received, before connecting the power source 302 to the power conductors 304 and instructing the intermediate power supply unit 250 to couple its power consuming components in the remote units 218(1)-218(X) to the power conductors 304 to once again allow current to flow from the power source 302 to the intermediate power supply unit 250 serviced by the power source 302.

Returning now to FIG. 3, the intermediate power supply unit 250 also includes a power converter circuit 312 that may optionally include a plurality of power converters 314(1)-314(X) or may optionally include only a single power converter 314 and a lower voltage bus. Each of these power converters 314(1)-314(X) includes a higher voltage input 316(1)-316(X) coupled to a corresponding power coupling output of the power coupling outputs of the power coupling circuit 308, and one or more lower voltage outputs 318(1)-318(X). These power converters 314(1)-314(X) convert voltage on the higher voltage inputs 316(1)-316(X) to a lower voltage applied to the one or more lower voltage outputs 318(1)-318(X) where the lower voltage is lower than the higher voltage. For example, the lower voltage may be less than sixty volts and possibly twenty-four volts. The intermediate power supply unit 250 may include a housing or chassis that contains the higher voltage power input 306, the power coupling circuit 308, the power converter circuit 312, and the plurality of power converters 314(1)-314(X). In some embodiments, the intermediate power supply unit 250 is installed relatively close to the remote units 218(1)-218(X) and therefore the power conductors 246(1)-246(X) are relatively short and the voltage drop on them is low although they transfer high current. In this way, a power coupling circuit 308 is not required to be included in each of the remote units 218(1)-218(X). This may reduce the cost of the remote units 218(1)-218(X) and/or enable the use of "standard" remote units that do not include the power coupling circuit 308 or other high voltage protection circuits. Also, another advantage of using such an intermediate power supply unit 250 that is based on high voltage/high power delivery with power shut down based on touch identification, is that the intermediate power supply unit 250 can be installed together with optical or wired communication lines. In embodiments that use wire based communication lines, the same wires/communication lines can be used to run the power. Examples of such power conductors 246(1)-246(X) are: Telephony lines that are used to carry xDSL modem (Digital) with voice (Analog) signals together with power, or alternatively Power over Ethernet (PoE) which carries power and Ethernet over CAT5 or CAT6 wire cables.

Figure 4:
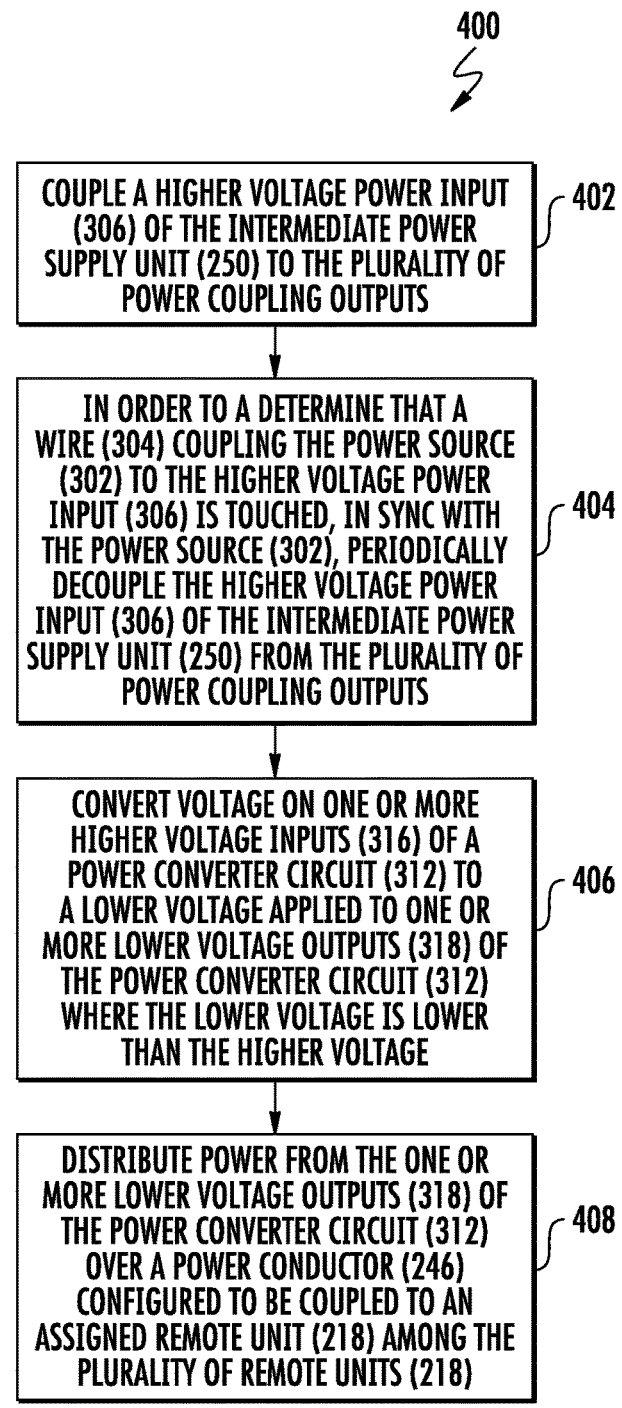
FIG. 4 is a flowchart illustrating an exemplary process of the intermediate power supply unit in the DCS in FIG. 3 distributing lower voltage power from a higher voltage power source to a plurality of remote units in a DCS.

FIG. 4 is a flowchart illustrating an exemplary process of the intermediate power supply unit 250 in the DCS 200 in FIG. 3 distributing lower voltage power from the higher voltage power source 302 to the plurality of remote units 218 in the DCS 200. As shown in the exemplary process 400 in FIG. 4 referencing the DCS 200 in FIG. 3, the intermediate power supply unit 250 is configured to couple the higher voltage power input 306 of the intermediate power supply unit 250 to the plurality of power coupling outputs (block 402 in FIG. 4). The intermediate power supply unit 250 is also configured to, in sync with power source 302, periodically decouple the higher voltage power input 306 of the intermediate power supply unit 250 in order to determine that a wire 304 coupling the power source 302 to the higher voltage power input 306 is touched (block 404 in FIG. 4). In some embodiments, this decoupling is in response to receiving a remote power connection signal indicating to decouple the higher voltage power input 306 of the intermediate power supply unit 250. As discussed above, the determination that the wire 304 coupling the power source 302 to the higher voltage power input 306 is touched is made by identifying an electrical characteristic that may indicate that the high voltage pair 304 is touched. This electrical characteristic may be identified, for example, by periodically decoupling the power conductors from its power consuming components in the intermediate power supply unit 250 from the power distribution system. Detecting a current from the power source in excess of a threshold current level, for example, may indicate a person contacting the power conductors.

With continuing reference to FIG. 4, the intermediate power supply unit 250 is configured to convert voltage on one or more higher voltage inputs 316 of the power converter circuit 312 to a lower voltage applied to one or more lower voltage outputs 318 of the power converter circuit 312 where the lower voltage is lower than the higher voltage (block 406 in FIG. 4). For example, the higher voltage power source 302 may be configured to provide 350 Volts and the lower voltage may be less than sixty volts and possibly twenty-four volts. The intermediate power supply unit 250 is also configured to distribute power from the one or more lower voltage outputs 318 of the power converter circuit 312 over a power conductor 246 configured to be coupled to an assigned remote unit 218 among the plurality of remote units 218 (block 406 in FIG. 4).

Figure 5:
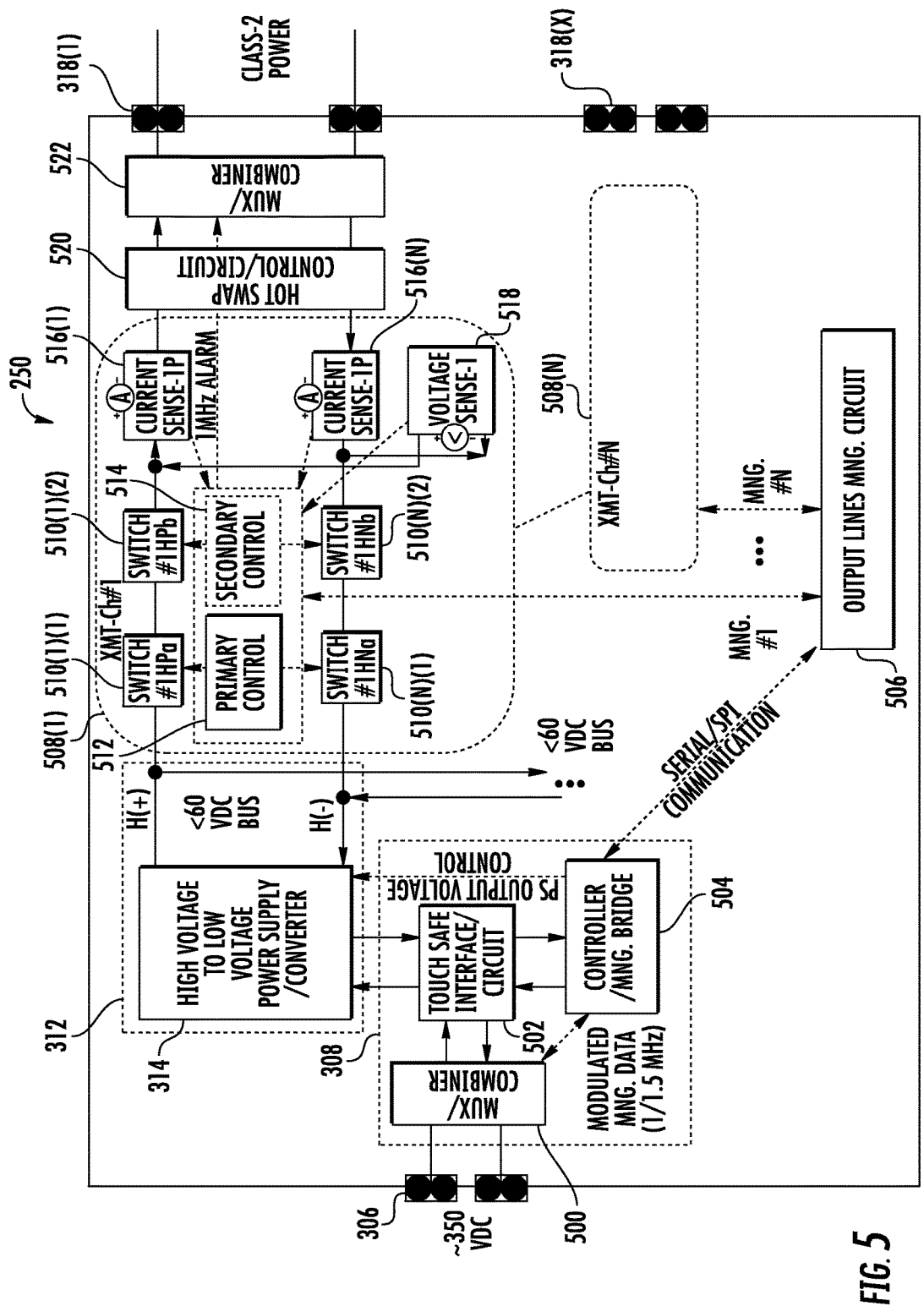
FIG. 5 is a schematic diagram illustrating exemplary detail for components that can be included in the intermediate power supply unit of FIG. 3.

FIG. 5 is a schematic diagram illustrating exemplary detail for components that can be included in the intermediate power supply unit 250 of FIG. 3. As described above in relation to FIG. 3, the intermediate power supply unit 250 receives power through higher voltage power inputs 306. In order to provide protection against electrification, the intermediate power supply unit 250 includes a power coupling circuit 308 coupled to the higher voltage power input 306. In some embodiments, this implements at least one side of a power shut down based on touch identification procedure. This power coupling circuit 308 provides protection against electrification by aiding in the identification that the high voltage pair 304 is touched. Once it is determined that the high voltage pair 304 is touched, the power from the high voltage pair 304 is decoupled within a short time, potentially before any damage to the human body occurs. As shown in FIG. 5, the power coupling circuit 308 includes an input multiplexing circuit 500, which may also be a combiner circuit, which interfaces the higher voltage power input 306 with a touch safe interface/circuit 502. This touch safe interface/circuit 502 communicates with a controller/management bridge 504 and the plurality of power converters 314. The input multiplexing circuit 500 may also separate a modulated management data signal to provide to the controller/management bridge 504. In some embodiments, this touch safe interface/circuit 502 is used to periodically disconnect the load from the high voltage pair 304 to allow the power source 302 and/or the optional controller circuit 310 to measure a current. In some embodiments, detecting that the measured current exceeds a predefined threshold current level indicates that the power conductor 304 coupling the power source 302 to the higher voltage power input 306 is touched. However, the ability of the power coupling circuit 308 to determine that the power conductor 304 coupling the power source 302 to the higher voltage power input 306 is touched is not limited thereto. In some embodiments, this touch safe interface/circuit 502 also has the ability to measure current consumption on the higher voltage power input 306 for control/management reasons. Specifically, the touch safe interface/circuit 502 may use this information to calculate the line resistance. This may also ensure that the line is not absorbing too much power and potentially getting overheated. Also, in embodiments where there is more than one intermediate power supply unit 250 connected to a single high voltage pair 304, the touch safe interface/circuit 502 may need to identify how much power is drawn by each of the intermediate power supply units 250.

With continuing reference to FIG. 5, the power coupling circuit 308 also has a serial or Serial Peripheral Interface bus (SPI) communication connection with an output lines management circuit 506. The output lines management circuit 506 communicates with each of the channel management circuits 508(1)-508(N). Each of these channel management circuits 508(1)-508(N) includes a number of switches 510(1)(1)-510(N)(2) that enable the channel management circuits 508(1)-508(N) to decouple the power from the one or more lower voltage outputs 318(1)-318(X). These switches 510(1)(1)-510(N)(2) are controlled by primary control 512 and optionally a secondary control 514 to provide redundancy. The primary control 512 and the secondary control 514 may optionally include an ability to send an alarm to the corresponding remote units 218(1)-218(X). The primary control 512 controls the switches 510(1)(1)-510(N)(1) while the optional secondary control 514 controls the switches 510(1)(2)-510(N)(2). The switches controlled by the primary control 512 are in series with the switches controlled by the secondary control 514. As such, even if one of these switches or controllers fails to activate when needed, the other switch might be able to decouple the power from the one or more lower voltage outputs 318(1)-318(X). This can enhance the safety of the system by greatly reducing the chances of a failure to decouple the power. For instance, if each switch in series has a one in a thousand chance of failure, the chance of both switches failing at the same time would only be one in a million.

The channel management circuits 508(1)-508(N) may also include a plurality of current sense circuits 516(1)-516(N) and a voltage sense circuit 518 to monitor the current and voltage flowing to the corresponding remote units 218(1)-218(X). Multiple current sense circuits 516(1)-516(N) can provide additional redundancy to increase the chances that the current is correctly sensed. Multiple current sense circuits 516(1)-516(N) can also improve the ability to identify unbalanced loading and/or faulty line conditions. The channel management circuits 508(1)-508(N) receive power from the power converters 314(1)-314(X). In some embodiments, this may be a common bus or isolated low voltage and low power outputs per each output port. FIG. 5 shows a common bus with less than 60 Volts.

With continuing reference to FIG. 5, the channel management circuits 508(1)-508(N) may also interface with a hot-swap control circuit 520. In some embodiments, the need for integrating the hot-swap circuit at the transmitting side arises especially in remote powering solutions when there is a need to feed remote units 218(1)-218(X) that did not integrate the hot-swap functionality at their powering input. The hot-swap control circuit 520 allows for reducing the level of surge current that a power supply must deliver and can allow smaller filter capacitors and a smaller power supply. Other benefits of the hot-swap control circuit 520 include smaller sized wiring and circuit traces, smaller and less expensive circuit connectors, and generally smaller components in the power path. In exemplary implementations, the hot-swap control circuit 520 can be implemented using actual electronic circuits and/or implemented using software controls based on the current sense circuits 516(1)-516(N) and the voltage sense circuit 518. The power from the hot-swap control circuit 520 then passes through an output multiplexing circuit 522, which may also be a combiner circuit, before distributing the power from the one or more lower voltage outputs 318(1)-318(X) over power conductors 246(1)-246(X) coupled to an assigned remote unit 218 among a plurality of remote units 218(1)-218(X). This output multiplexing circuit 522 can be used, for example, to include management and/or communications signals such as the optional alarm signal to the plurality of remote units 218(1)-218(X) along with the power. As shown in FIG. 5, the one or more lower voltage outputs 318(1)-318(X) provide Class-2 power. This refers to the amount of power and voltage permitted on the conductors. Generally, due to these limitations, Class-2 power is considered safe from an electrical shock standpoint.

Figure 6:
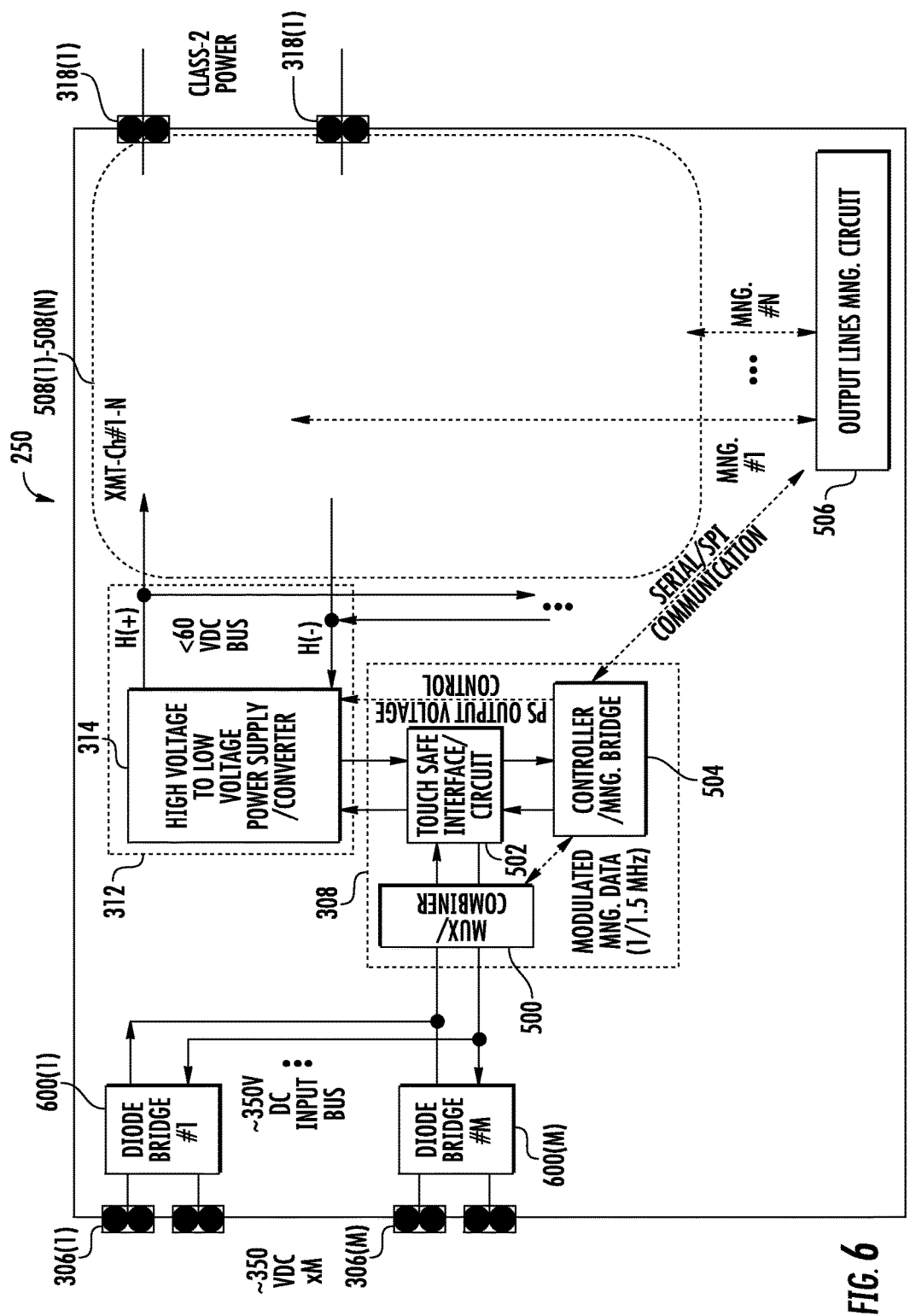
FIG. 6 is an exemplary intermediate power supply unit of FIG. 3 that includes a plurality of higher voltage power inputs.

FIG. 6 is an exemplary intermediate power supply unit 250 of FIG. 3 that includes a plurality of higher voltage power inputs 306(1)-306(M). Some embodiments may use the additional higher voltage power inputs 306(1)-306(M) to increase the amount of power provided to the intermediate power supply unit 250. In these embodiments, the intermediate power supply unit 250 may include a combining circuit such as a corresponding number of diode bridges 600(1)-600(M) to combine the current provided by the higher voltage power inputs 306(1)-306(M) before providing the power to the power coupling circuit 308. The remainder of FIG. 6 is identical to the components in FIG. 5 discussed above. For conciseness, these elements are not described again. Notably, FIG. 6 also illustrates embodiments of the intermediate power supply unit 250 that do not include the optional hot-swap control circuit 520.

An exemplary DCS 200 that can include the intermediate power supply unit 250 was discussed above in relation to FIG. 2. Additional details of the exemplary DCS 200 at can include the intermediate power supply unit 250 are described in FIGS. 7-8.

In this regard, FIG. 7 is a schematic diagram of the exemplary DCS 200 in the form of DAS 202. A DAS is a system that is configured to distribute communications signals, including wireless communications signals, from a central unit to a plurality of remote units over physical communications media, to then be distributed from the remote units wirelessly to client devices in wireless communication range of a remote unit. The DAS 202 in this example is an optical fiber-based DAS that is comprised of three (3) main components. One or more radio interface circuits provided in the form of radio interface modules (RIMs) 204(1)-204(T) are provided in a central unit 206 to receive and process downlink electrical communications signals 208D(1)-208D(S) prior to optical conversion into downlink optical communications signals. The downlink electrical communications signals 208D(1)-208D(S) may be received from a base transceiver station (BTS) or baseband unit (BBU) as examples. The downlink electrical communications signals 208D(1)-208D(S) may be analog signals or digital signals that can be sampled and processed as digital information. The RIMs 204(1)-204(T) provide both downlink and uplink interfaces for signal processing. The notations "1-S" and "1-T" indicate that any number of the referenced component, 1-S and 1-T, respectively, may be provided.

With continuing reference to FIG. 7, the central unit 206 is configured to accept the plurality of RIMs 204(1)-204(T) as modular components that can easily be installed and removed or replaced in a chassis. In one embodiment, the central unit 206 is configured to support up to twelve (12) RIMs 204(1)-204(12). Each RIM 204(1)-204(T) can be designed to support a particular type of radio source or range of radio sources (i.e., frequencies) to provide flexibility in configuring the central unit 206 and the DAS 202 to support the desired radio sources. For example, one RIM 204 may be configured to support the Personal Communication Services (PCS) radio band. Another RIM 204 may be configured to support the 700 MHz radio band. In this example, by inclusion of these RIMs 204, the central unit 206 could be configured to support and distribute communications signals, including those for the communications services and communications bands described above as examples.

The RIMs 204(1)-204(T) may be provided in the central unit 206 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the received downlink electrical communications signals 208D(1)-208D(S) are provided to a plurality of optical interfaces provided in the form of optical interface modules (OIMs) 210(1)-210(W) in this embodiment to convert the downlink electrical communications signals 208D(1)-208D(S) ("downlink electrical communications signals 208D(1)-208D(S)") into downlink optical communications signals 212D(1)-212D(S). The notation "1-W" indicates that any number of the referenced component 1-W may be provided. The OIMs 210 may include one or more optical interface components (OICs) that contain electrical-to-optical (E-O) converters 216(1)-216(W) to convert the received downlink electrical communications signals 208D(1)-208D(S) into the downlink optical communications signals 212D(1)-212D(S). The OIMs 210 support the radio bands that can be provided by the RIMs 204, including the examples previously described above. The downlink optical communications signals 212D(1)-212D(S) are communicated over a downlink optical fiber communications link 214D to a plurality of remote units 218(1)-218(X) provided in the form of remote antenna units in this example. The notation "1-X" indicates that any number of the referenced component 1-X may be provided. One or more of the downlink optical communications signals 212D(1)-212D(S) can be distributed to each remote unit 218(1)-218(X). Thus, the distribution of the downlink optical communications signals 212D(1)-212D(S) from the central unit 206 to the remote units 218(1)-218(X) is in a point-to-multipoint configuration in this example.

With continuing reference to FIG. 7, the remote units 218(1)-218(X) include optical-to-electrical (O-E) converters 220(1)-220(X) configured to convert the one or more received downlink optical communications signals 212D(1)-212D(S) back into the downlink electrical communications signals 208D(1)-208D(S) to be wirelessly radiated through antennas 222(1)-222(X) in the remote units 218(1)-218(X) to user equipment (not shown) in the reception range of the antennas 222(1)-222(X). The OIMs 210 may also include O-E converters 224(1)-224(W) to convert the received uplink optical communications signals 212U(1)-212U(X) from the remote units 218(1)-218(X) into the uplink electrical communications signals 226U(1)-226U(S) as will be described in more detail below.

With continuing reference to FIG. 7, the remote units 218(1)-218(X) are also configured to receive uplink electrical communications signals 228U(1)-228U(X) received by the respective antennas 222(1)-222(X) from client devices in wireless communication range of the remote units 218(1)-218(X). The uplink electrical communications signals 228U(1)-228U(S) may be analog signals or digital signals that can be sampled and processed as digital information. The remote units 218(1)-218(X) include E-O converters 229(1)-229(X) to convert the received uplink electrical communications signals 228U(1)-228U(X) into uplink optical communications signals 212U(1)-212U(X). The remote units 218(1)-218(X) distribute the uplink optical communications signals 212U(1)-212U(X) over an uplink optical fiber communication link 214U to the OIMs 210(1)-210(W) in the central unit 206. The O-E converters 224(1)-224(W) convert the received uplink optical communications signals 212U(1)-212U(X) into uplink electrical communications signals 230U(1)-230U(X), which are processed by the RIMs 204(1)-204(T) and provided as the uplink electrical communications signals 230U(1)-230U(X) to a source transceiver such as a base transceiver station (BTS) or baseband unit (BBU).

Note that the downlink optical fiber communications link 214D and the uplink optical fiber communications link 214U coupled between the central unit 206 and the remote units 218(1)-218(X) may be a common optical fiber communications link, wherein for example, wave division multiplexing (WDM) may be employed to carry the downlink optical communications signals 212D(1)-212D(S) and the uplink optical communications signals 212U(1)-212U(X) on the same optical fiber communications link. Alternatively, the downlink optical fiber communications link 214D and the uplink optical fiber communications link 214U coupled between the central unit 206 and the remote units 218(1)-218(X) may be single, separate optical fiber communications link, wherein for example, wave division multiplexing (WDM) may be employed to carry the downlink optical communications signals 212D(1)-212D(S) on one common downlink optical fiber and the uplink optical communications signals 212U(1)-212U(X) carried on a separate, only uplink optical fiber. Alternatively, the downlink optical fiber communications link 214D and the uplink optical fiber communications link 214U coupled between the central unit 206 and the remote units 218(1)-218(X) may be separate optical fibers dedicated to and providing a separate communications link between the central unit 206 and each remote unit 218(1)-218(X).

The DCS 200 in FIG. 7 can be provided in an indoor environment as illustrated in FIG. 2. As discussed above, FIG. 2 is a partially schematic cut-away diagram of a building infrastructure 232 employing the DCS 200. FIG. 8 is a schematic diagram of the DCS 200 installed according to the building infrastructure 232 in FIG. 2.

FIG. 8 is a partially schematic cut-away diagram of an exemplary building infrastructure in which a DCS 200 in FIG. 7 can be provided. With reference to the DCS 200 shown in FIG. 8, the central unit 206 may include a power supply circuit 252 to provide power to the RIMs 204(1)-204(T), the OIMs 210(1)-210(W), and radio distribution circuits (RDCs) 254, 256. The downlink electrical communications signals 208D(1)-208D(S) and the uplink electrical communications signals 226U(1)-226U(S) are routed from between the RIMs 204(1)-204(T) and the OIMs 210(1)-210(W) through RDCs 254, 256. In one embodiment, the RDCs 254, 256 can support sectorization in the DCS 200, meaning that only certain downlink electrical communications signals 208D(1)-208D(S) are routed to certain RIMs 204(1)-204(T). A power supply circuit 258 may also be provided to provide power to the OIMs 210(1)-210(W). An interface 260, which may include web and network management system (NMS) interfaces, may also be provided to allow configuration and communication to the components of the central unit 206. A microcontroller, microprocessor, or other control circuitry, called a head-end controller (HEC) 262 may be included in central unit 206 to provide control operations for the central unit 206 and the DCS 200.

As discussed above in reference to FIG. 2 and with continuing reference to FIG. 8, the power distribution circuits 244(1)-244(F) may be provided in the DCS 200 to remotely supply power to the remote units 218(1)-218(X) for operation. For example, the power distribution circuits 244(1)-244(F) may be configured to supply direct current (DC) power due to relative short distances and as a safer option than distributing alternating current (AC) power. Further, distributing DC power may avoid the need to provide AC-DC conversion circuitry in the remote units 218(1)-218(X) saving area and cost. Remotely distributing power to the remote units 218(1)-218(X) may be desired if it is difficult or not possible to locally provide power to the remote units 218(1)-218(X) in their installed locations. For example, the remote units 218(1)-218(X) may be installed in ceilings or on walls of a building. Even if local power is available, the local power may not be capable of supplying enough power to power the number of remote units 218(1)-218(X) desired. However, regulations may also limit the amount of DC that is remotely delivered by the power distribution circuits 244(1)-244(F) over the power conductors 246(1)-246(F) to less than the amount needed to power the remote units 218(1)-218(X) during peak power consumption periods for safety reasons, such as in the event a human contacts the power conductors 246(1)-246(F). One solution to these remote power distribution limitations is to employ multiple power conductors 246(1)-246(F) and split current from the power distribution circuits 244(1)-244(F) over the multiple power conductors 246(1)-246(F) as shown, such that the current on any one power conductor 246(1)-246(F) is below the regulated limit. Another solution includes delivering remote power at a higher voltage so that a lower current can be distributed at the same power level. For example, assume that 300 Watts of power is to be supplied to a remote unit 218(1)-218(X) by a power distribution circuit 244(1)-244(F) through a respective power conductor 246(1)-246(F). If the voltage of the power distribution circuit 244(1)-244(F) is 60 Volts (V), the current will be 5 Amperes (A) (i.e., 300 W/60 V). However, if a 400 Volt is employed, then the current flowing through the wires will be 0.75 A. However, delivering high voltage through power conductors 246(1)-246(F) may be further regulated to prevent an undesired current from flowing through a human in the event that a human contacts the power conductor 246(1)-246(F). Thus, these safety measures may require other protections, such as the use of protection conduits for the array cables 245(1)-245(F), which may make installations of the DCS 200 more difficult and add cost.

Figure 9:
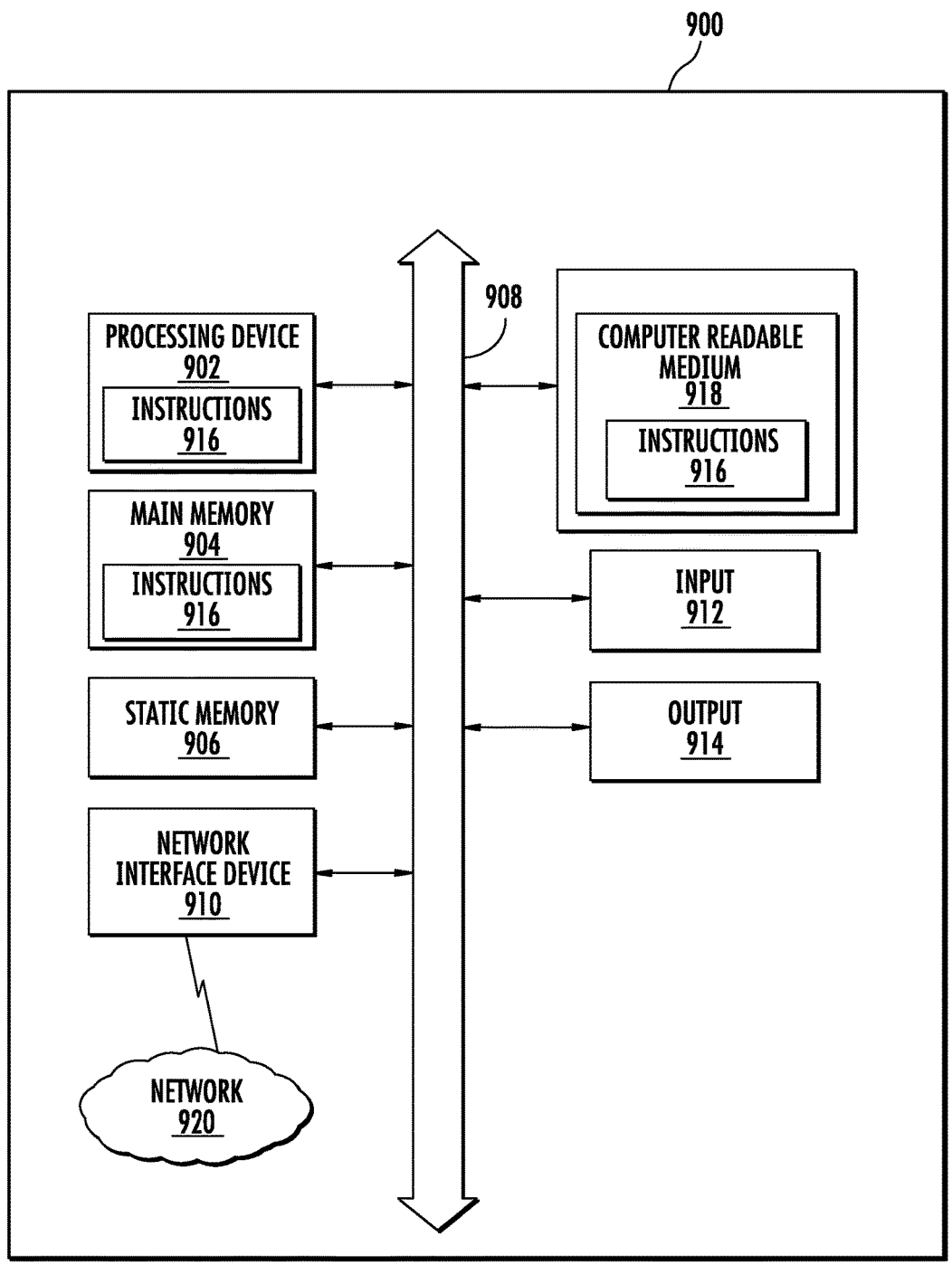
FIG. 9 is a schematic diagram of a generalized representation of an exemplary controller that can be included in any component in a DCS, including but not limited to the controller circuits in the power distribution systems for coupling a remote unit to a power source during a normal operation phase and instructing the remote unit to decouple from the power source during testing phases when current from the power source is measured at the source side during a testing phase, wherein an exemplary computer system is adapted to execute instructions from an exemplary computer readable link.

FIG. 9 is a schematic diagram representation of additional detail illustrating a computer system 900 that could be employed in any component in the DCS 200, including but not limited to the controller circuits 504 in the at least one intermediate power supply unit 250 for coupling a remote unit 218 to the power source 302 during a normal operation phase and decoupling the remote unit 218 from the power source 302 to determine that the wires have been touched, including but not limited to the DCS 200 in FIGS. 2, 7, and 8. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to program and configure programmable digital signal processing circuits in a DCS for supporting scaling of supported communications services. The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or static memory 906 directly or via some other connectivity means. The processor 902 may be a controller, and the main memory 904 or static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904, and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communications system (DCS), comprising:
   a central unit configured to:
      distribute received one or more downlink communications signals over one or more downlink communications links to one or more remote units;
      distribute received one or more uplink communications signals from the one or more remote units from one or more uplink communications links to one or more source communications outputs;
   a plurality of remote units, each remote unit among the plurality of remote units comprising:
      a remote power input coupled to a power conductor carrying current from an intermediate power supply unit; and
      a remote management communications input coupled to a management communications link;
      the remote unit configured to:
         distribute the received one or more downlink communications signals received from the one or more downlink communications links, to one or more client devices; and
         distribute the received one or more uplink communications signals from the one or more client devices to the one or more uplink communications links; and
   at least one intermediate power supply unit comprising:
      a higher voltage power input configured to receive power distributed by a power source;
      a power coupling circuit coupled to the higher voltage power input comprising a plurality of power coupling outputs,
         the power coupling circuit configured to couple the higher voltage power input to the plurality of power coupling outputs; and
         the power coupling circuit further configured to decouple the higher voltage power input from the plurality of power coupling outputs in order to determine that a power conductor coupling the power source to the higher voltage power input is touched; and
      a power converter circuit comprising a higher voltage input coupled to a corresponding power coupling output of the plurality of power coupling outputs of the power coupling circuit, and one or more lower voltage outputs;
         the power converter circuit configured to convert voltage on the higher voltage inputs to a lower voltage applied to the one or more lower voltage outputs where the lower voltage is lower than the higher voltage; and
         the power converter circuit further configured to distribute power from the one or more lower voltage outputs over a power conductor coupled to an assigned remote unit among a plurality of remote units.

2. The DCS of claim 1, wherein the power coupling circuit is configured to:
   receive a remote power connection signal indicating to decouple the higher voltage power input from the plurality of power coupling outputs; and
   decouple the higher voltage power input from the plurality of power coupling outputs in response to the remote power connection signal.

3. The DCS of claim 1, further comprising one or more extended remote units, each extended remote unit among the one or more extended remote units, comprising:
   an extended remote communications input coupled to an extended downlink communications link coupled to a remote unit among the plurality of remote units;
   a remote communications output coupled to an extended uplink communications link coupled to the remote unit; and
   an extended remote power input coupled to an extended power conductor carrying current from the remote unit to the extended remote unit.

4. The DCS of claim 1, wherein the central unit is configured to:
   distribute each of the received one or more downlink communications signals over a distribution communications output among a plurality of distribution communications outputs to a downlink communications link among the one or more downlink communications links; and
   distribute each of the received one or more uplink communications signals from an uplink communications link among the one or more uplink communications links on a distribution communications input among the plurality of distribution communications inputs, to the one or more source communications outputs.

5. The DCS of claim 1 comprising a distributed antenna system (DAS).

6. The DCS of claim 1, wherein:
   the one or more downlink communications links comprise one or more optical downlink communications links;
   the one or more uplink communications links comprise one or more optical uplink communications links;
   the central unit further comprising:
      one or more electrical-to-optical (E-O) converters configured to convert the received one or more electrical downlink communications signals into one or more optical downlink communications signals;
      one or more optical-to-electrical (O-E) converters configured to convert the received one or more optical uplink communications signals into one or more electrical uplink communications signals;
   the central unit further configured to:
      distribute the one or more optical downlink communications signals from the one or more E-O converters over the plurality of optical distribution communication outputs to the one or more optical downlink communications links; and
      distribute the received one or more optical uplink communications signals from the one or more optical uplink communications links on the plurality of optical distribution communications inputs, to the one or more O-E converters;
   wherein each remote unit among the plurality of remote units further comprises:
      one or more optical-to-electrical (O-E) converters configured to convert the received one or more optical downlink communications signals into one or more electrical downlink communications signals;
      one or more electrical-to-optical (E-O) converters configured to convert received one or more electrical uplink communications signals into the one or more optical uplink communications signals; and
   each remote unit among the plurality of remote units configured to:
      distribute the one or more electrical downlink communications signals from the one or more O-E converters, to one or more client devices; and
      distribute the one or more optical uplink communications signals from the one or more E-O converts to the one or more optical downlink communications links.

7. The DCS of claim 1, wherein one or more intermediate power supply units further comprise a hot-swap control circuit coupled between the plurality of power converters and the one or more lower voltage outputs;
   the hot-swap control circuit configured to reduce a level of surge current of the power distributed from the one or more lower voltage outputs to be sent to the assigned remote unit among the plurality of remote units.

8. The DCS of claim 1, wherein the at least one intermediate power supply unit is comprised in an interconnect unit for routing communications signals to the plurality of remote units.

9. The DCS of claim 1, wherein the power conductor coupled to the assigned remote unit among the plurality of remote units is routed together with the communications signals to the assigned remote unit among the plurality of remote units.

10. The DCS of claim 1, wherein the higher voltage power input configured to receive the power distributed by the power source receives the distributed power from an interconnect unit for routing communications signals to the plurality of remote units.

11. The DCS of claim 1, further comprising:
   one or more additional higher voltage power inputs configured to receive the power distributed by the power source; and
   a combining circuit coupled to the power coupling circuit configured to combine the power received from the higher voltage power input and at least one of the one or more additional higher voltage power inputs.

12. The intermediate power supply unit of claim 1, wherein the power conductor coupling the power source to the higher voltage power input is longer than the power conductor coupled to the assigned remote unit among a plurality of remote units.

13. The intermediate power supply unit of claim 1, further comprising a housing containing the higher voltage power input, the power coupling circuit, and the plurality of power converters.

* * * * *